United States Patent [19]

Akagi et al.

[11] Patent Number: 5,054,439
[45] Date of Patent: Oct. 8, 1991

[54] INTAKE SYSTEM FOR AUTOMOTIVE ENGINE

[75] Inventors: Yuji Akagi, Hatsukaichi; Shunki Okazaki, Hiroshima, both of Japan

[73] Assignee: Mazda Motor Corporation, Hiroshima, Japan

[21] Appl. No.: 489,055

[22] Filed: Mar. 7, 1990

[30] Foreign Application Priority Data

Mar. 8, 1989 [JP] Japan .................................... 1-55454

[51] Int. Cl.$^5$ ............................................. F02B 75/18
[52] U.S. Cl. .............................. 123/52 M; 123/216; 123/432
[58] Field of Search ......... 123/52 M, 52 MB, 52 ML, 123/65 A, 65 P, 216, 242, 308, 432

[56] References Cited

U.S. PATENT DOCUMENTS

4,513,707 4/1985 Tadokoro et al. .................. 123/216
4,627,395 12/1986 Tadokoro et al. .................. 123/216
4,706,621 11/1987 Okimoto et al. .................... 123/216
4,756,284 7/1988 Okimoto et al. .................... 123/216

*Primary Examiner*—Noah P. Kamen
*Attorney, Agent, or Firm*—Fleit, Jacobson, Cohn, Price, Holman & Stern

[57] ABSTRACT

An intake system is incorporated in a multi-cylinder internal combustion engine having a plurality of cylinders each being provided with at least three intake ports, at least one of the three intake port being timed to close after the remaining intake ports which are timed to close closely to each other. The intake system includes a main intake pipe introducing intake air into the intake system. The main intake pipe is connected to the remaining intake ports of the cylinder by way of a common intake pipe and to the at least one intake port of the cylinder by way of an intake pipe provided independently from the common intake pipe.

13 Claims, 7 Drawing Sheets

INTAKE SYSTEM FOR AUTOMOTIVE ENGINE

FIELD OF THE INVENTION

The present invention relates to an intake system for an automotive engine, and more particularly to an intake system for an automotive engine in which improved charging efficiency is obtained by utilizing kinetic effects, such as inertia effects, of an intake air and which is made compact.

BACKGROUND OF THE INVENTION

In recent years, an automotive internal combustion engine, even in a rotary type, with more than three intake ports for each cylinder has been developed to improve charging efficiency of intake air so as to increase engine horsepower. An intake system, used for such multi-port automotive internal combustion engine as having three intake ports, namely primary, secondary and auxiliary supplementary intake ports, is adapted to carry intake air to the cylinder through the primary intake port in low engine load conditions, the primary and secondary intake ports in middle engine load conditions or all the three intake ports in high engine load conditions. Examples of such a rotary internal combustion engine and intake system is disclosed in, for example, Japanese Unexamined Patent Publication Nos. 60(1985)-93124 and 61(1986)-251422, respectively.

The three port internal combustion engine is generally designed to close the primary and secondary intake ports in close proximity and the auxiliary intake port with a delay of significant time behind the primary and secondary intake ports. This is because, kinetic effects, such as inertia effects or resonance effects, of intake air generally decrease charging efficiency of intake air at high engine speeds and such a decrease of charging efficiency must be avoided.

An intake system conventionally used in cooperation with the three port internal combustion engine has first and second discrete intake passages branching off from, for example, a surge tank which is connected to the primary and secondary intake ports of each cylinder, respectively for the reason of providing the individual discrete intake passage having a length suitable for inertial supercharging, of giving the individual discrete intake passages a sufficient volume to prevent a delay of intake on acceleration and of causing the engine to change smoothly its output power according to changes of engine load at the commencement or the end of intake air through the secondary intake port. The auxiliary intake port is connected to either the first discrete intake passage communicating the cylinder through the primary intake port or the second discrete intake passage communicating the cylinder through the secondary intake port in an attempt at avoiding the complex and bulky structure of the intake system.

Because the first and second discrete intake passages are formed by relatively large pipes, the intake system is, however, not immune to structural complexity and bulkiness. Furthermore, although the primary or the secondary intake port itself enjoys an inertial charging effect by providing an appropriate length of discrete intake passage therefore, from the viewpoint of the intake system as a whole, inertial charging effect is considerably decreased due to such an interference of compressed pressure waves between the primary and secondary intake ports that, for example, compressed pressure waves introduced into a combustion chamber of the cylinder through the secondary intake port immediately before the secondary intake port has been closed blows out through the primary intake port, or vice versa. That is because, although the primary and secondary intake ports are in close proximity in close timing, compressed and expanded pressure waves, which are out of phase, are introduced into the discrete intake passages, respectively.

Because of the discrete passage for the auxiliary intake port common to either the first or the second discrete intake passage, it is impossible to provide an optimum length of passage which can introduce compressed pressure waves immediately before the auxiliary intake port is timely closed, so that intake air is difficult to be introduced through the auxiliary intake port with sufficiently enhanced inertial charging effects.

SUMMARY OF THE INVENTION

It is, therefore, a primary object of the present invention to provide an intake system for a multi-port internal combustion engine which is structurally simple and compact.

The above object of the present invention is achieved by providing an intake system used in cooperation with a multi-cylinder internal combustion engine having a plurality of cylinders each of which is provided with at least three intake ports, at least one of the three intake ports being timed to close after the remaining intake ports which are timed to close closely to each other. The intake system includes main intake pipe means introducing intake air into the intake system. The remaining intake ports and at least one intake port of the cylinder are connected to the main intake pipe means by way of common intake pipe means and intake pipe means provided independently from the common intake pipe means, respectively.

The intake system is in cooperation particularly with an automotive internal combustion engine having a cylinder which is provided with primary and secondary intake ports &timed to close in close proximity to each other and at least one auxiliary intake port timed to close after the primary and secondary intake ports, and opens the primary intake port in low engine load conditions, both of the primary and secondary intake ports in middle engine load conditions, or all the primary, secondary and at least one auxiliary intake ports in high engine load conditions, to introduce intake air into the cylinder. The intake system comprises first intake pipe means for commonly connecting the primary and secondary intake ports of the cylinder to the main intake pipe means and second intake pipe means provided independently from the first intake pipe means for connecting the at least one auxiliary intake port to the main intake pipe means.

The intake system also cooperates with a rotary piston internal combustion engine having a cylinder or rotary housing which is provided with primary and secondary intake ports timed to close in close proximity to each other and first and second auxiliary intake ports timed to close in close proximity to each other but after the primary and secondary intake ports, and opens the primary intake port in low engine load conditions, both of the primary and secondary intake ports in middle engine load conditions, or all the primary, secondary and first and second auxiliary intake ports in high engine load conditions, to introduce intake air into the cylinder. For such cooperation with the four-intake port, internal combustion engine, the intake system comprises first intake pipe means for commonly connecting the primary and secondary intake ports of the cylinder to a main intake pipe means main intake pipe means for introducing intake air into the intake system and second intake pipe means provided independently from the first intake pipe means for commonly connecting the first and second auxiliary intake ports to the main intake pipe means.

The intake system may comprise first intake pipe means for connecting the primary intake port of the cylinder to main intake pipe means introducing intake air into the intake system, second intake pipe means provided independently from the first intake pipe for connecting the secondary intake port of the cylinder to the main intake pipe means and third intake pipe means provided independently from both of the first and second intake pipe means for commonly connecting the first and second auxiliary intake ports to the main intake pipe means; and surge tank means disposed between the main and first intake pipes.

BRIEF DESCRIPTION OF THE DRAWINGS

Still other aspects the present invention and more specific features will become apparent to those having ordinary skill in the art from the following description of the preferred embodiments considered together with the accompanying drawings, wherein like reference numbers have been used in different figures to denote the same parts in structure and operation and in which.

DETAILED DESCRIPTION OF THE INVENTION

An intake system in accordance with a preferred embodiment of the present invention is cooperates with a rotary internal combustion engine. Because such rotary internal combustion engines are well known, this description will be directed in particular to elements forming part of, or cooperating directly with, the intake system embodying the present invention. It is to be understood, however, that engine elements not specifically shown or described may take various forms known to those skilled in the art.

Figure 1:
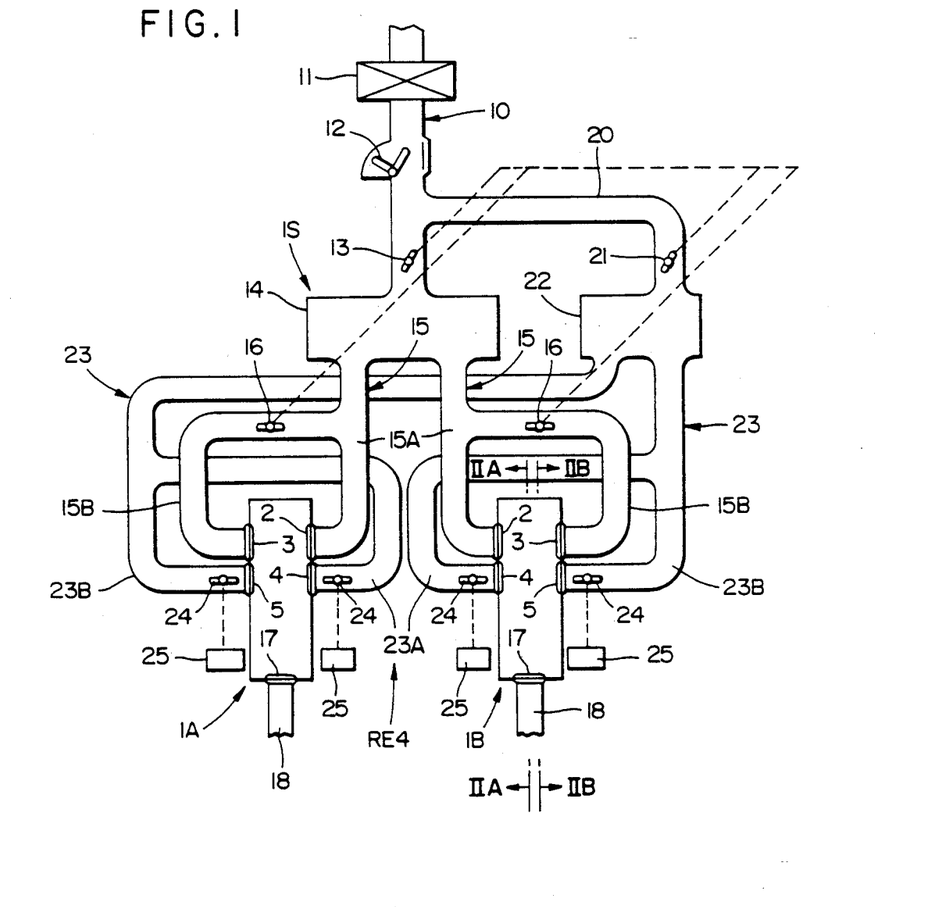
FIG. 1 is a structural illustration showing an intake system in accordance with a preferred embodiment of the present invention which cooperates with a four-intake port rotary piston engine.
Figure 2A:
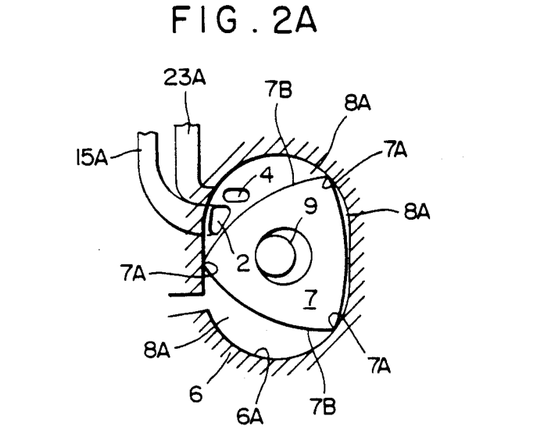
FIG. 2A is a cross-sectional view taken along IIA—IIA of FIG. 1.
Figure 2B:
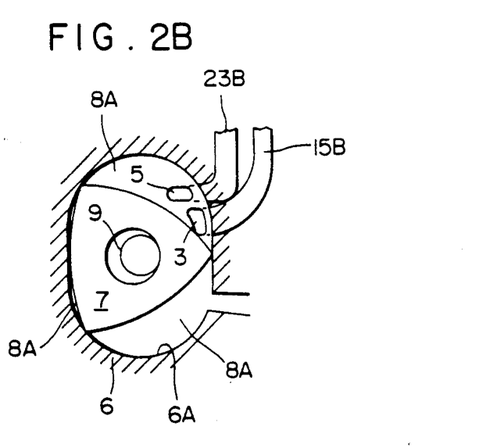
FIG. 2B is a cross-sectional view taken along IIB—IIB of FIG. 1.

Referring to the drawings, particularly to FIGS. 1, 2A and 2B, an intake system in accordance with a preferred embodiment of the present invention is diagrammatically illustrated, cooperating with an automotive internal combustion engine, such as a two-rotor, four-intake port, rotary piston engine (which is hereinafter referred simply to as a rotary engine) RE4 having two rotors 7 in cylinders or rotor housings 1A and 1B. The rotor housings 1A, 1B of this type have a curved, oblong inner shape known as a 2-node trochoid curve. The space between the inside trochoid curve and the exterior is hollowed out to allow passage of coolant. The rotor housings 1A and 1B are separated by an intermediate rotor housing (not shown) and the open outer end of the rotor housing is covered by an end housings or side plates 6. The rotor 7, made of a special cast iron and shaped triangle, has an inner bearing surface that rides on a rotor journal of an eccentric shaft 9. These rotors revolve around the eccentric shaft rotor journal in the same direction as the eccentric shaft 9 with a phase difference of 180° and, at the same time, keeping all three rotor tips 7A constantly close to the trochoid wall 6A of the rotor housing 6, so as to constantly form three rotor chambers 8A between rotor faces or flanks 7B and rotor housing 8. This planetary motion of the rotor 7 is well known to those skilled in the art and need not be explained in more detail herein.

Figure 3:
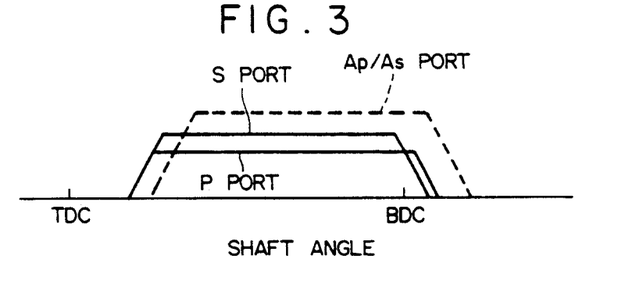
FIG. 3 is a timing chart for intake port valves of the intake system shown in FIG. 1.

Each rotor housing 1A, 1B is formed with a primary intake port (P) 2 and a first auxiliary intake port (Ap) 4 in the end housing 6 and a secondary intake port (S) 3 and a second auxiliary intake port (As) 5 in the intermediate rotor housing. These intake ports 2–5 are controlled to open and close at timings previously established as shown in FIG. 3. For example, the intake ports 2–5 are timed to close at 40°, 30°, 80° and 80°, respectively, after the bottom dead center (BDC) of the eccentric shaft 9.

The intake system IS has a main intake pipe 10 provided with an air cleaner 11, an air flow meter 12, a primary throttle valve 13 and a surge tank 14 arranged in order from the upstream side thereof. The main intake pipe 10 branches off into two first common intake pipes 15 from the surge tank 14. Each first common intake pipe 15 branches off into two intake pipes 15A and 15B, respectively, connected to the primary and secondary intake ports 2 and 3 of each rotary housing 1A, 1B. The secondary intake pipe 15B is provided with a secondary throttle valve 16 disposed therein.

The main intake pipe 10, between the air flow meter 12 and primary throttle valve 13, further branches off into an auxiliary intake pipe 20 which is provided with a third throttle valve 21 and an auxiliary surge tank 22. The auxiliary intake pipe 20 branches off into two second common intake pipes 23 from the auxiliary surge tank 22. Each second common intake pipe 23 branches off into two, first and second, auxiliary intake pipes 23A and 23B, respectively, connected to the first and second auxiliary intake ports 4 and 5 of each rotary housing 1A, 1B. The first and second auxiliary intake pipes 23A and 23B are provided with auxiliary throttle valves 24 disposed therein, which auxiliary throttle valves 24 are actuated to open and close by exhaust gas-operated actuators 25 respectively associated therewith. The rotary housing 1A, 1B is formed with an exhaust port 17 attached with an exhaust pipe 18.

Figure 4:
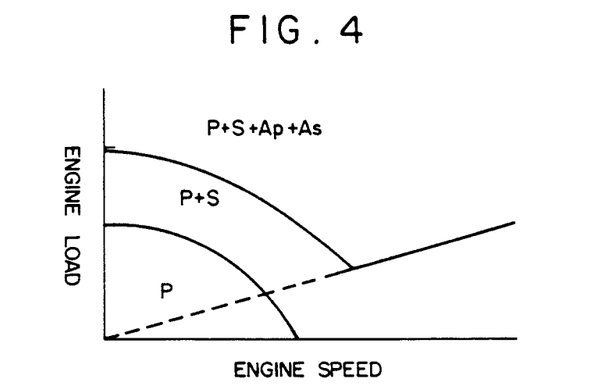
FIG. 4 is a diagram showing intake port operating ranges.

The primary, secondary and third throttle valves 13, 16 and 21 are mechanically linked to one another; the first throttle valve is operationally coupled to an acceleration pedal (not shown) in a well known manner. Depressing the acceleration pedal causes the primary throttle valve 13 only to open in low engine load conditions, both the primary and secondary throttle valves 13 and 16 to open in middle engine load conditions or all three throttle valves 13, 16 and 21 to open in high engine load conditions. Because exhaust pressure increases according to increases of engine load, all the actuators 25 are designed to be actuated so as to keep all the auxiliary throttle valves 24 open. As is shown in FIG. 4, according to engine speeds and engine loads, intake air is introduced into the primary intake port 2 through the primary throttle valve 13 in low engine load conditions, into the primary and secondary intake ports 2 and 3 through the primary and secondary throttle valve 13 and 16 in middle engine load conditions, or into all the intake ports 2 to 5 through the primary, secondary, third and auxiliary throttle valves 13, 16, 21 and 24 in high engine load conditions. Designated by a reference character NL in FIG. 4 is a deceleration line or no load line.

In the operation of the intake system depicted in FIGS. 1, 2A and 2B, expanded pressure waves produced in each common intake pipe 15 are propagated upstream and reversed in its direction at a position where the first common intake pipe 15 opens to the surge tank 14, being changed to compression pressure waves, when the primary and secondary intake port 2 and 3 are open. The compression pressure waves are then propagated downstream in the intake pipes 15A and 15B in the same phase. Although there is a slight time lag between timings at which the primary and secondary intake pipes 2 and 3 open, respectively, providing the first common intake pipe 15 and intake pipes 15A and 15B with appropriate lengths allows it to propagate the compression pressure waves in the same phase to the primary and secondary intake ports 2 and 3 immediately before these intake ports 2 and 3 close, so as to increase charging efficiency with improved pulsations and inertia effects.

Because, if a total length Ls of the intake pipes 15A and 15B is too short, compression pressure waves propagated to the primary intake port 2 are reversed to expansion pressure waves there and propagated to the secondary intake port 3 immediately before the secondary intake pipe 3 closes, creating a loss of intake air charged through the secondary intake port 3 with inertia effects, designing the total length Ls has limitations to avoid such loss of intake air at the secondary intake port 3. That is, letting Lx be the propagation length of expanded pressure waves, the total length of the intake pipes 15A and 15B should satisfy the following condition:

$Lx > Lx$ $Lx = (\theta Sc - Sp) \times (60/360N) \times C \times (1/n)$ where $\theta Sc$ is the crank angle when the secondary port 3 closes;

$\theta Sp$ is the crank angle when expanded pressure waves are created at the primary intake port 2;

N is an engine speed in rpm.;

C is a propagation speed of pressure waves; and n is the number of positive order of pulsations, which is, for example in this embodiment, one (1).

As an example, in such a case that $\theta Sc - \theta Sp = 10$ degrees (which is apparently the timing difference between the primary and secondary intake ports 2 and 3), N = 6,000 rpm., c = 343 m/sec., and n = 1, the propagation length Lx is 10 cm. Therefore, the intake pipes 15A and 15B should be longer in total length Ls than 10 cm.

On the other hand, if the total length Ls is too long, the intake pipes 15A and 15B are considered to be substantially completely independent from each other. From simulations, if the total length Ls becomes longer than 50 cm., the intake pipes 15A and 15B communicating with the first common intake pipe 15 lose their intended functions. Accordingly, the total length Ls should satisfy the following condition:

10 cm. < Ls < 50 cm.

As long as the total length of the intake pipes 15A and 15B satisfies the above conditions, it is ensured to conduct compression pressure waves created in the first common intake pipe 15 into the air intake chamber 8A through the primary and secondary intake ports 2 and 3 in the same phase immediately before closing the primary and secondary intake ports 2 and 3, thereby increasing charging efficiency.

According to the intake system structured above, because of the connection of the first common intake pipe 15 to the surge tank 14, not only the responsibility of charging intake air is improved on acceleration but also the change of the amount of charged intake air is suppressed when engine load changes from low to high or vise versa, no fluctuations is produced in engine output.

Because each rotary housing 1A, 1B is connected to the second common intake pipe 23 at its first and second auxiliary intake ports 4 and 5 through the first and second auxiliary intake pipes 23A and 23B, it is ensured to conduct compression pressure waves created in the second common intake pipe 23 into the air intake chamber 8A through the first and second auxiliary intake ports 4 and 5 in the same phase immediately before closing the first and second intake ports 2 and 3, thereby increasing charging efficiency.

Because there is no timing difference in intake port opening between the first and second auxiliary intake ports 4 and 5, which corresponds to $\theta Sc - \theta Sp = 0$, as long as the total length Las of the first and second auxiliary intake pipes 23A and 23B is less than 50 cm., intake air conducted through the second common and first and second auxiliary intake pipes 23, 23A and 23B acts effectively.

Figure 5:
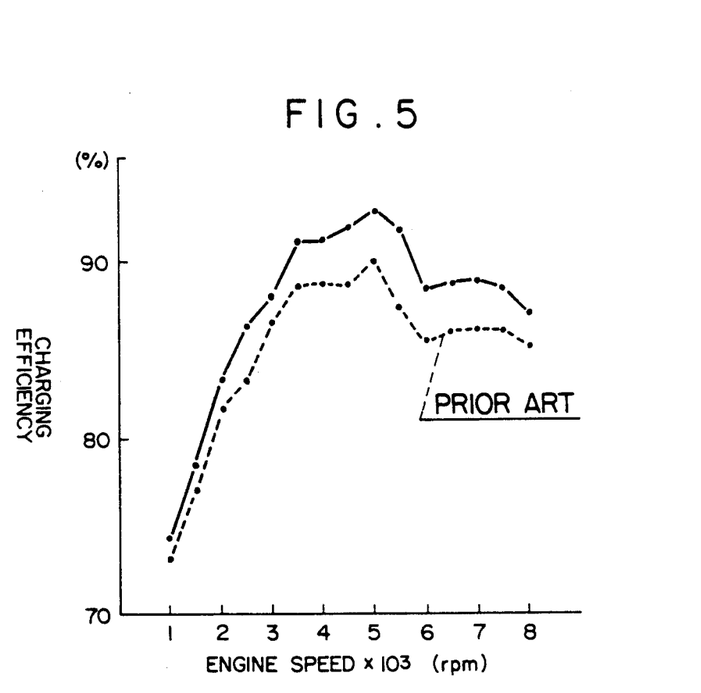
FIG. 5 is a graph showing charging efficiency of the intake system shown in FIG. 1.

To understand the result of the intake system according to the above preferred embodiment of the present invention, there is shown in FIG. 5 charging effects of the intake system of the present invention and a conventional intake system under full throttle conditions. The conventional intake system used for comparison is provided with two intake pipes independently connected to primary and secondary intake ports of each rotary cylinder, respectively. Both intake systems were cooperated with a 645 cc, two-rotor rotary piston engine having a compression ratio E of 9.4 and is not provided with any turbo charger. As apparent from FIG. 5, charging efficiency is considerably improved in the intake system compared to the conventional one.

Figure 6:
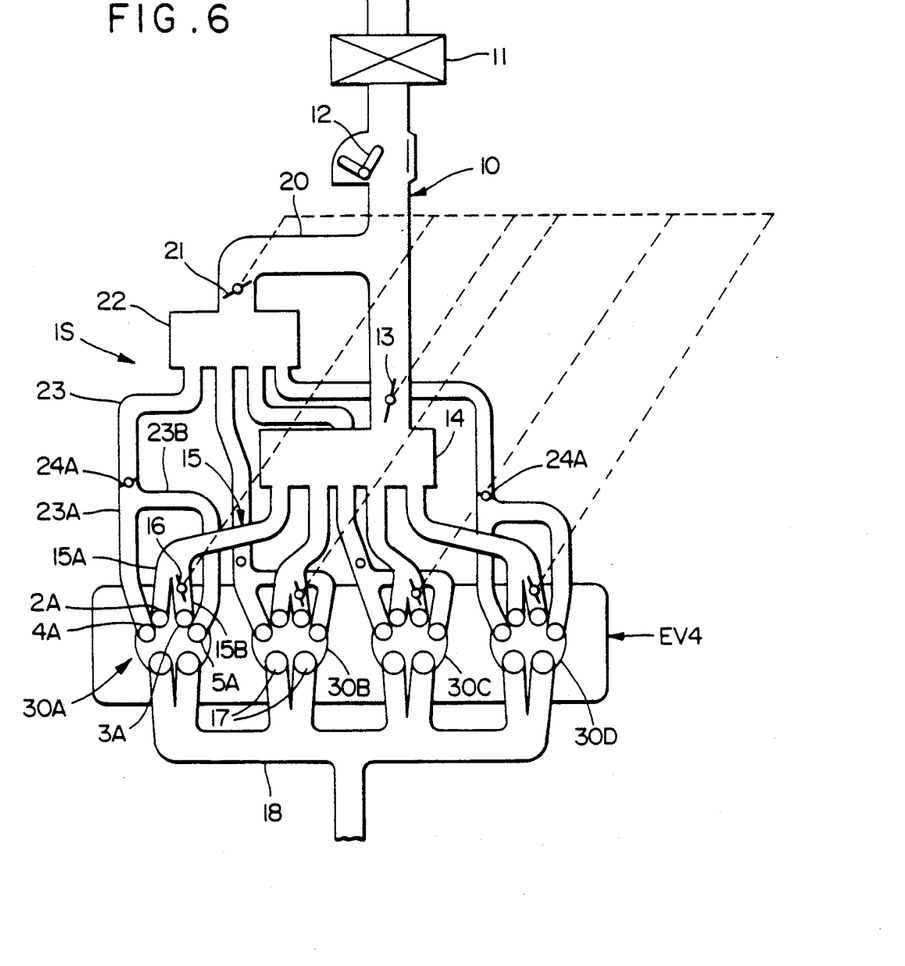
FIG. 6 is a structural illustration showing an intake system in accordance with a preferred embodiment of the present invention which is used in cooperation with a reciprocating piston engine.

FIG. 6 shows an intake system in accordance with another preferred embodiment of the present invention which cooperates with a vertical type, four cylinder, reciprocating piston engine (which is hereinafter referred to as a V-4 engine) VE4. As shown, the V-4 engine VE has four, namely first to fourth cylinders 30A, 30B, 30C and 30D, each being provided with primary, secondary, and first and second auxiliary intake ports 3A, 4A and 5A.

The intake system IS has a main intake pipe 10 provided with an air cleaner 11, an air flow meter 12, a primary throttle valve 13 and a surge tank 14 arranged in order from the upstream side thereof. The main intake pipe 10 branches off into four first common intake pipes 15 from the surge tank 14. Each first common intake pipe 15 branches off into two, namely primary and secondary, intake pipes 15A and 15B near each cylinder 30A-30D which are, respectively, connected to the primary and secondary intake ports 2A and 3A of each cylinder 30A-30D. The secondary intake pipe 15B is provided with a secondary throttle valve 16 disposed therein.

The main intake pipe 10 further branches off after the air flow meter 12 into an auxiliary intake pipe 20 which is provided with a third throttle valve 21 and an auxiliary surge tank 22. The auxiliary intake pipe 20 branches off into four second common intake pipes 23 from the auxiliary surge tank 22. Each second common intake pipe 23 branches off into two, first and second, auxiliary intake pipes 23A and 23B connected to the first and second auxiliary intake ports 4A and 5A of each rotor housing 30A-30D, respectively and is provided with an auxiliary throttle valves 24A disposed close to the first and second auxiliary intake pipes 23A and 23B therein. These auxiliary throttle valves 24A are maintained open by exhaust gas-operated actuators (not shown), respectively, associated therewith in high engine load conditions.

In this embodiment, the intake pipes 15A and 15B are of course designed to have the total length Ls satisfying the condition described in the previous embodiment.

Figure 7:
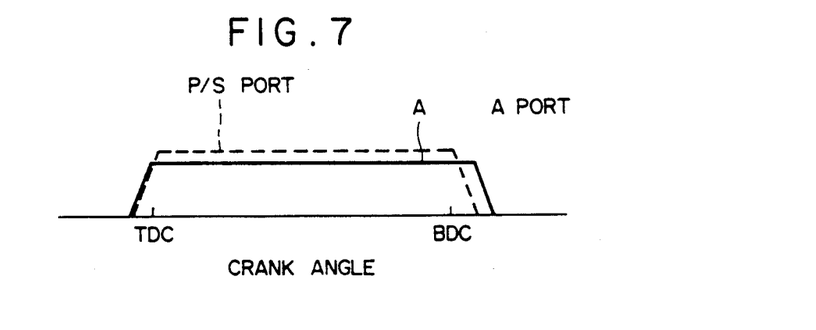
FIG. 7 is a timing chart for intake port valves of the intake system shown in FIG. 6.

All the intake ports 2A to 5A of each cylinder 30A-30D are opened and closed by intake valves whose operating timings are shown in FIG. 7. It is noted that the primary, secondary and third throttle valve 13, 16 and 21 are the same in structure and operation as in the previous embodiment and t[:at conditions in which the intake ports 2A to 5A operate are the same as those in the previous embodiment, and therefore need not be described in detail again.

Figure 8:
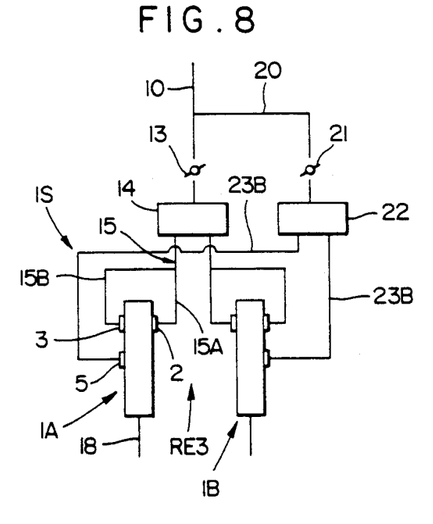
FIGS. 8 to 11 are structural illustrations, similar to FIG. 1, showing intake systems in accordance with other various preferred embodiments of the present invention.

FIG. 8 shows an intake system in accordance with still another preferred embodiment of the present invention which is adapted to cooperate with a two-rotor, three-intake port rotary piston engine RE3. In the intake system IS of this embodiment, no first auxiliary intake pipe, similar to the first auxiliary intake pipe 23A in the first embodiment shown in FIG. 1 is provided, because the two-rotor, three-intake port rotary piston engine RE3 has not two, but one auxiliary intake port. The auxiliary intake ports 5 of the respective rotor housings 1A and 1B are directly connected to the auxiliary surge tank 22 by way of the auxiliary intake pipes 23B provided independently from each other. It is noted that the secondary and auxiliary throttle valves 16 and 24 are, although not shown in FIG. 8, provided in the same positions as in the first embodiment.

Figure 9:
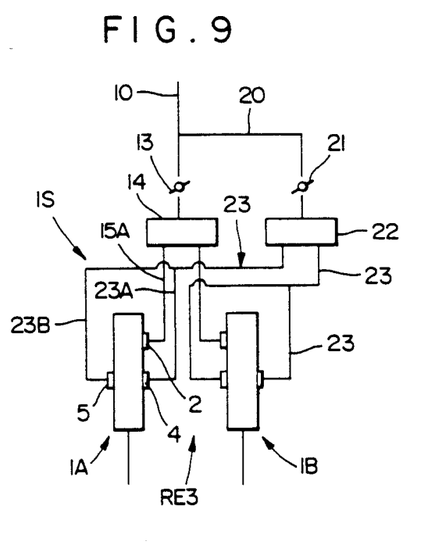

FIG. 9 shows an intake system in accordance with yet another preferred embodiment of the present invention which is adapted to cooperate with a two-rotor, three-intake port rotary piston engine RE3. In the intake system IS of this embodiment, no intake pipe, similar to the intake pipe 15B in the first embodiment shown in FIG. 1 is provided, because the two-rotor, three-intake port rotary piston engine RE3 has no secondary intake port. The primary intake ports 2 of the respective rotor housings 1A and 1B are directly connected to the surge tank 14 by way of the intake pipes 15A provided independently from each other. It is noted that the auxiliary throttle valve 24 is, although not shown in FIG. 9, provided in the same positions as in the first embodiment.

Figure 10:
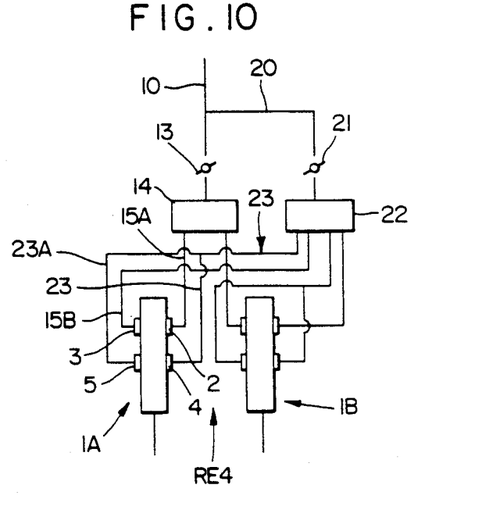

FIG. 10 shows an intake system in accordance with a further preferred embodiment of the present invention which is adapted to cooperate with a two-rotor, four-intake port rotary piston engine RE wherein the secondary intake port 3 is connected to the auxiliary surge tank 22. In the intake system IS of this embodiment, the primary port 2 is connected to the intake pipe 15A which extends from the surge tank 14 and is independent from the second common intake pipe 23; the secondary intake port 3 is connected to the intake pipe 15B which extends from the auxiliary surge tank 22 and is independent from the second common intake pipe 23. Because intake air passing through the auxiliary intake pipe 20 flows into the secondary intake port 3, it is necessary to install the auxiliary intake pipe 20 and auxiliary surge tank 22 made slightly large. It is noted that although the secondary and auxiliary throttle valves 16 and 24 are not shown in FIG. 10, the third throttle valve 21 acts for the secondary throttle valve 16 and the auxiliary valve 24 is provided in the same positions as in the first embodiment.

Figure 11:
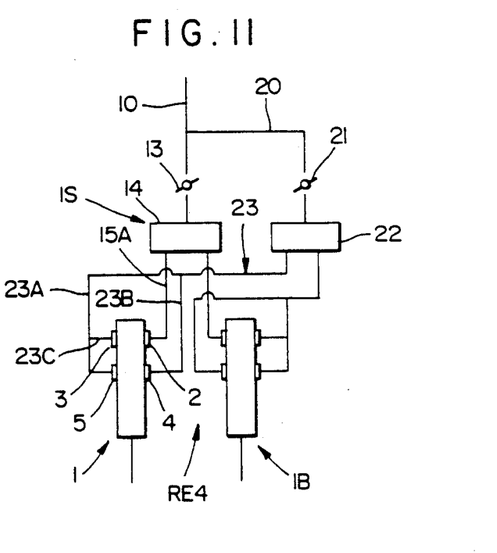

FIG. 11 shows an intake system in accordance with a still further preferred embodiment of the present invention which is adapted to cooperate with a two-rotor, four-intake port rotary piston engine RE wherein the secondary intake port 3 is connected to the auxiliary surge tank 22 by way of the second common intake pipe 23. In the intake system IS of this embodiment, the primary port 2 is connected to the intake pipe 15A which extends from the surge tank 14 and is independent from the second common intake pipe 23; the secondary intake port 3 is connected to the second auxiliary intake pipe 23B extending from the auxiliary surge tank 22 by way of a connecting pipe 23C. It is necessary in this embodiment to install the auxiliary intake pipe 20 and auxiliary surge tank 22 made slightly large in the intake system IS for the same reason as in the intake system shown in FIG. 10. It is also noted that although the secondary and auxiliary throttle valves 16 and 24 are not shown in FIG. 10, the third throttle valve 21 acts for the secondary throttle valve 16 and the auxiliary valve 24 is provided in the same positions as in the first embodiment.

Figure 12:
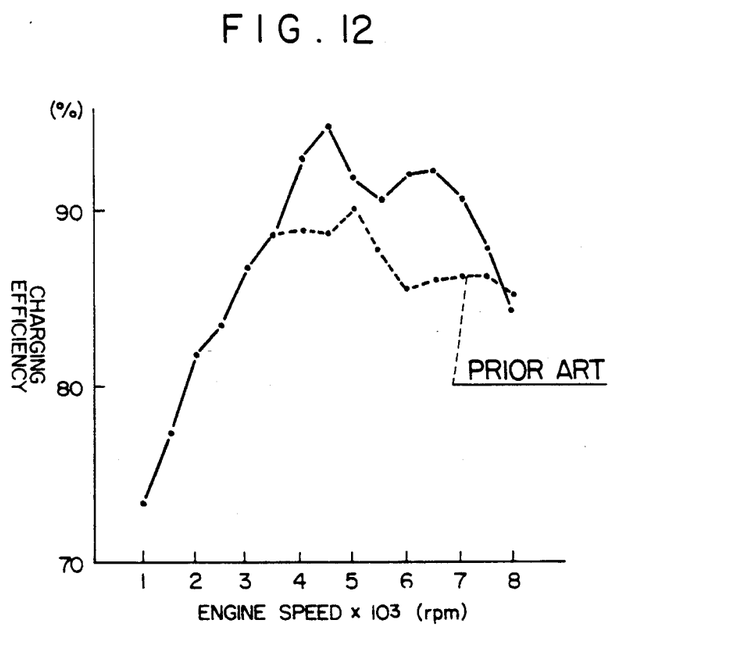
FIG. 12 is a graph showing charging efficiency of the intake system shown in FIG. 11.

Reference is made to FIG. 12 to understood the result of the intake system shown in FIG. 11 according to the still further preferred embodiment of the present invention. FIG. 5 shows charging effects of the intake system shown in FIG. 12 of the present invention and a conventional intake system under full throttle conditions. The conventional intake system used in comparison is provided with two intake pipes independently connected to primary and secondary intake ports of each rotary cylinder, respectively. Both intake systems cooperate with a 645 cc, two-rotor rotary piston engine having a compression ratio E of 9.4 and was not provided with any turbo charger. As apparent from FIG. 12, charging efficiency is considerably improved in the intake system compared to the conventional one.

Figure 13:
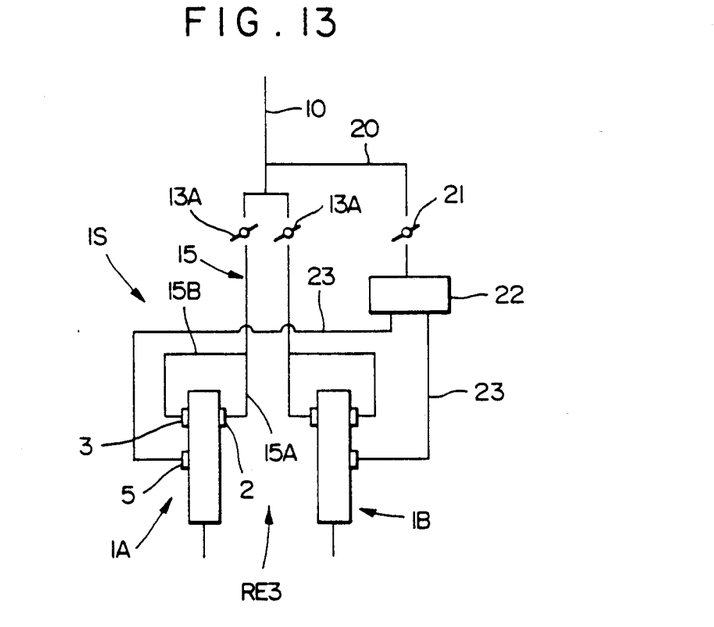
FIGS. 13 to 17 are structural illustrations, similar to FIG. 1, showing intake systems in accordance with still other various preferred embodiments of the present invention.

FIG. 13 shows an intake system in accordance with a yet further preferred embodiment of the present invention in which the surge tank 14 and intake pipe 23A for the first auxiliary intake port 4 as provided in the previous embodiments are omitted and which cooperates with a two-rotor, three-intake port rotary piston engine RE3. In the intake system IS of this embodiment, the primary and secondary ports 2 and 3 are, respectively, connected to the first and second intake pipes 15A and 15B into which the first common intake pipe 15 with the primary throttle valve 13A disposed therein directly branches off. The secondary auxiliary intake port 5 is connected to the second common intake pipe 23 which is independent from the first common intake pipe 15 and extends directly from the auxiliary surge tank 22. Because there is no surge tank between the main and first common intake pipes 10 and 15, compression pressure waves created at primary and secondary intake ports 2 and 3 are intensely amplified, so that the intake system of this embodiment is desirable to improve charging efficiency. It is necessary in this embodiment to install the auxiliary intake pipe 20 and auxiliary surge tank 22 made slightly large in the intake system IS for the same reason as in the intake system previously shown. It is noted that although the secondary and auxiliary throttle valves 16 and 24 are also not shown in FIG. 13, the third throttle valve 21 acts for the secondary throttle valve 16 and the auxiliary valve 24 is provided in the same positions as in the first embodiment.

Figures 14, 16:
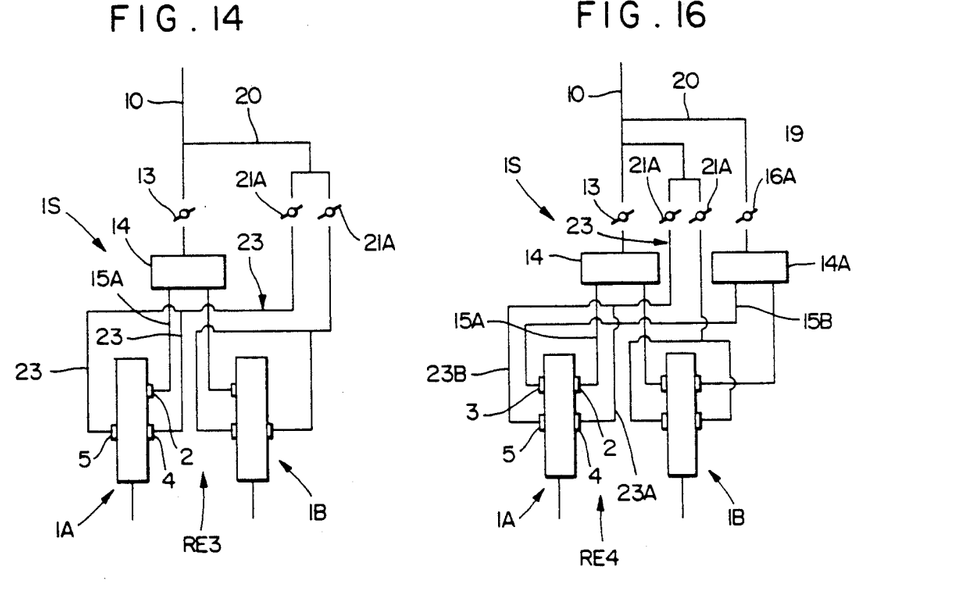

FIG. 14 shows an intake system in accordance with an eighth preferred embodiment of the present invention in which the surge tank 14 and intake pipe 15B for the secondary intake port 3 as provided in the previous embodiments are omitted and which cooperates with a two-rotor, three-intake port rotary piston engine RE3. In the intake system IS of this embodiment, the primary and secondary ports 2 and 3 are, respectively, connected to the first intake pipe 15A which extends directly from the surge tank 14; the primary and secondary auxiliary intake ports 4 and 5 are connected to the second common intake pipe 23 with the third throttle valve 21A by way of the auxiliary intake pipes 23A and 23B, respectively.

Because there is no auxiliary surge tank between the auxiliary and second common intake pipes 20 and 23, compression pressure waves created in the second common intake pipe 23 are intensely amplified, so that the intake system of this embodiment is also desirable to improve charging efficiency. It is noted that although the auxiliary throttle valve 24 is also not shown in FIG. 14, it is provided in the same positions as in the first embodiment.

Figure 15:
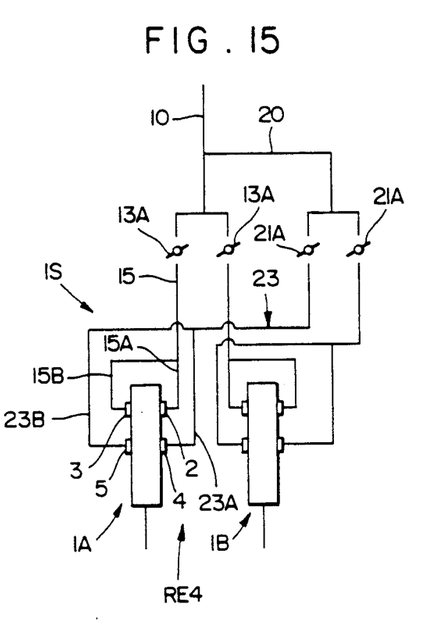

FIG. 15 shows an intake system in accordance with a ninth preferred embodiment of the present invention in which the surge tank 14 and auxiliary surge tank 22 as provided in the previous embodiments are omitted and which cooperates with a two-rotor, four-intake port rotary piston engine RE4. The intake system IS of this embodiment is exactly the same as that of the first embodiment shown in FIG. 1 and need not be explained in detail.

FIG. 16 shows an intake system in accordance with a tenth preferred embodiment of the present invention in which a second surge tank 14A is provided for delivering intake air to the secondary intake ports 3 independently from the primary intake ports 2, and hence, the first common intake pipe 15 and the auxiliary surge tank 22 as provided in the previous embodiments are omitted and which cooperate with the two-rotor, four-intake port rotary piston engine RE4. Because the intake system of this embodiment has the same operation as the first or eighth embodiment it need not be explained again. In the intake system IS, the main intake pipe 10 further branches off into an intake pipe 19 between the air flow meter and the surge tank 14. The intake pipe 19 is provided with the second throttle valve 16A and the surge tank 14A in order. The secondary intake ports 3 of the rotor housings 1A and 1B are directly connected to intake pipes 15B, respectively, extending from the second surge tank 14A independently from each other. It is also noted that although the auxiliary throttle valve 24 is also not shown in FIG. 16, it is provided in the same positions as in the first embodiment.

Figure 17:
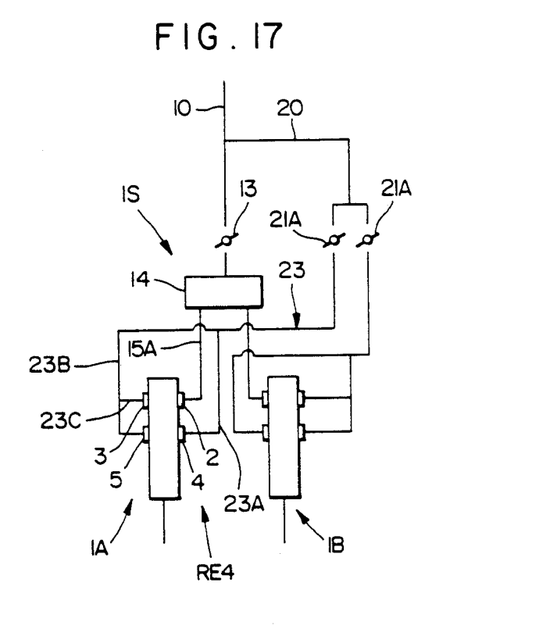

FIG. 17 shows an intake system in accordance with an eleventh preferred embodiment of the present invention which is similar in structure to that shown in FIG. 11 excepting the omission of auxiliary surge tank 22. In this intake system IS, the first and second intake ports 4 and 5 are connected to the second common intake pipe 23 with the third throttle valve 21A branched off from the auxiliary intake pipe 20 by way of the intake pipes 23A and 23B into which the second common pipe 23 branches off, respectively, and the secondary intake port 3 is connected to the intake pipe 23B by way of the connecting pipe 23C. It is noted that although the auxiliary throttle valve 24 is not shown also in FIG. 17, it is provided in the same positions as in the first embodiment.

Figure 18:
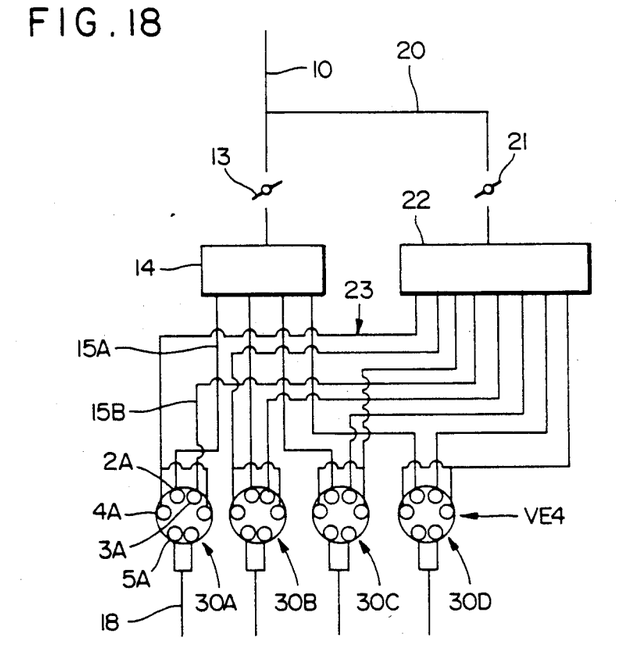
FIG. 18 and 19 are structural illustrations, similar to FIG. 6, showing intake systems in accordance with further preferred embodiments of the present invention.

FIG. 18 shows a variation of the intake system in accordance with the second preferred embodiment of the present invention shown in FIG. 6. In this intake system, intake air is delivered to the secondary intake port 3A from the auxiliary surge tank 22 by way of the intake pipe 15B while to the primary intake port 2A from the main surge tank 14 by way of the intake pipe 15A.

Figure 19:
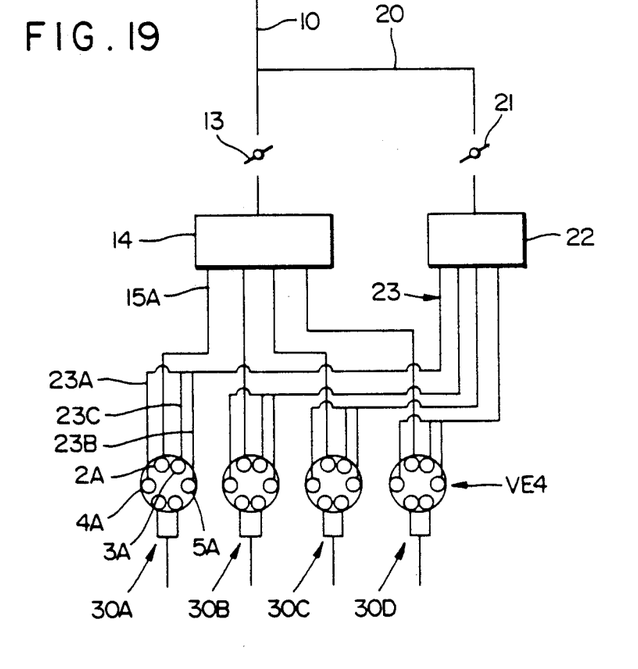

FIG. 19 shows another variation of the intake system in accordance with the second preferred embodiment of the present invention shown in FIG. 6. In this intake system, intake air is delivered to the secondary intake port 3A from the auxiliary surge tank 22 by way of the intake pipe 23C which is one the intake pipes branched off from the second common intake pipe 23 connected to the auxiliary surge tank 22.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true spirit and scope of the present invention, they should be construed as included herein.

What is claimed is:

1. In combination, an automotive internal combustion engine and an intake system for said automotive internal combustion engine, comprising:

a cylinder provided with at least three intake ports, at least one of said at least three intake ports being timed to close after the remaining intake ports, which are timed to close closely to each other;

main intake pipe means for introducing intake air into said intake system;

first intake pipe means for commonly connecting said remaining intake ports of said cylinder to said main intake pipe means; and second intake pipe means provided independently from said first intake pipe means for connecting said at least one intake port to said main intake pipe means.

2. An automotive internal combustion engine and intake system combination as recited in claim 1, and further comprising a first surge tank disposed between said main intake pipe means and said first intake pipe means.

3. An automotive internal combustion engine and intake system combination as recited in claim 2, and further comprising a second surge tank, separate from said first surge tank, disposed between said main intake pipe means and said second intake pipe means.

4. An automotive internal combustion engine and intake system combination as recited in claim 3, wherein each of said first and second surge tanks are respectively connected to said main intake pipe means by passages separately branching off from said main intake pipe means.

5. In combination, an automotive internal combustion engine and an intake system for said automotive internal combustion engine, comprising:

a cylinder which is provided with primary and secondary intake ports timed to close closely to each other, and at least one auxiliary intake port timed to close after said primary and secondary intake ports;

means for opening only said primary intake port in low engine load conditions, both of said primary and secondary intake ports in middle engine load conditions, or all said primary, secondary and at least one auxiliary intake ports in high engine load conditions, to introduce intake air into the cylinder;

main intake pipe means for introducing intake air into said intake system;

first intake pipe means for commonly connecting said primary and secondary intake ports of said cylinder to said main intake pipe means; and second intake pipe means provided independently from said first intake pipe means for connecting said at least one auxiliary intake port to said main intake pipe means.

6. An automotive internal combustion engine and intake system combination as recited in claim 5, and further comprising a first surge tank disposed between said main intake pipe means and said first intake pipe means.

7. An automotive internal combustion engine and intake system combination as recited in claim 6, and further comprising a second surge tank, separate from said first surge tank, disposed between said main intake pipe means and said second intake pipe means.

8. An automotive internal combustion engine and intake system combination as recited in claim 7, wherein each of said first and second surge tanks are respectively connected to said main intake pipe means by passages separately branching off from said main intake pipe means.

9. In combination, an automotive internal combustion engine and an intake system for said automotive internal combustions engine, comprising:

a cylinder which is provided with primary and secondary intake ports timed to close closely to each other, and first and second auxiliary intake ports timed to close closely to each other but after said primary and secondary intake ports;

means for opening only said primary intake port in low engine load conditions, both of said primary and secondary intake ports in middle engine load conditions, or all said primary, secondary and first and second auxiliary intake ports in high engine load conditions, to introduce intake air into the cylinder;

main intake pipe means for introducing intake air into said intake system;

first intake pipe means for commonly connecting said primary and secondary intake ports of said cylinder to said main intake pipe means; and second intake pipe means provided independently from said first intake pipe means for commonly connecting said first and second auxiliary intake ports to said main intake pipe means.

10. An automotive internal combustion engine and intake system combination as recited in claim 9, and further comprising a first surge tank disposed between said main intake pipe means and said first intake pipe means.

11. An automotive internal combustion engine and intake system combination as recited in claim 10, and further comprising a second surge tank, separate from said first surge tank, disposed between said main intake means and said second intake pipe means.

12. An automotive internal combustion engine and intake system combination as recited in claim 11, wherein each of said first and second surge tanks are respectively connected to said main intake pipe means by passages separately branching off from said main intake pipe means.

13. In combination, an automotive rotary piston internal combustion engine and an intake system for said automotive rotary piston internal combustion engine, comprising:

a cylinder which is provided with primary and secondary intake ports timed to close closedly to each other, and first and second auxiliary intake ports timed to close closely to each other but after said primary and secondary intake ports;

means for opening only said primary intake port in low engine load conditions, both of said primary and secondary intake ports in middle engine load conditions, or all said primary, secondary and first and second auxiliary intake ports in high engine load conditions, to introduce intake air into the cylinder;

main intake pipe means for introducing intake air into said intake system;

first intake pipe means for connecting said primary intake port of said cylinder to said main intake pipe means;

second intake pipe means provided independently from said first intake pipe for connecting said secondary intake port of said cylinder to said main intake pipe means;

third intake pipe means provided independently from both of said first and second intake pipe means for commonly connecting said first and second auxiliary intake ports to said main intake pipe means; and surge tank means disposed between said main and first intake pipes.

* * * * *